Nov. 6, 1962   N. A. HURST ET AL   3,062,269
MANUFACTURE OF PNEUMATIC TYRES
Filed Oct. 31, 1958   4 Sheets-Sheet 4

INVENTORS
Norman Gilbert Hurst
Thomas James Walton
by Benj. T. Carter
their attorney

United States Patent Office 3,062,269
Patented Nov. 6, 1962

3,062,269
MANUFACTURE OF PNEUMATIC TYRES
Norman Ashcroft Hurst, Four Oaks, and Thomas James Walton, Liverpool, England, assignors to Dunlop Rubber Company Limited, London County, England, a British company
Filed Oct. 31, 1958, Ser. No. 771,148
Claims priority, application Great Britain Nov. 28, 1957
13 Claims. (Cl. 156—398)

This invention relates to the manufacture of pneumatic tyres.

Tyres normally include a "chafer strip" of cord fabric, rubber or other suitable material which embraces the bead wire at each edge of the tyre to protect it from damage during fitting and removal operations when in use.

In manufacture of the tire, chafer strips, coated with adhesive solution and dried, are wound around the outer surface of the tyre carcass, overhanging its edges, during the building process. The over hanging edges are turned around and under the bead wires, and the outside edges are covered by the side wall rubber, which is next applied.

After building the tyre, the chafer strip must be consolidated or pressed into close adherence with the beaded edge of the carcass so as to ensure the absence of air pockets which could lead to separation of the chafer strip from the bead when the tyre is in use, or, in the case of tubeless tyres, leakage of air between the bead and the chafer strip.

Normally the chafer strip is consolidated by hand rolling with a profiled roller, the tyre being supported on a bench after removal from the building drum. This operation is frequently unsatisfactory since the manually applied pressure varies, and is generally insufficient to ensure uniform adherence all around the bead.

According to the present invention apparatus for consolidating chafer strips in the manufacture of pneumatic tyres comprises a rigid encircling member for receiving a raw tyre or tyre carcass in the substantially cylindrical condition in which it is built, and a planet roller within the encircling member, the encircling member and the roller being relatively rotatable and relatively movable so as to cause the roller to engage and ride round the inner surface of the chafer strip on the bead of a tyre or carcass received in the encircling member whilst gripping it against the wall of the member so as to consolidate the chafer strip to the bead throughout its circumference.

According to a further feature of the invention a method of manufacture of a pneumatic tyre comprises building the tyre or tyre carcass in a substantially cylindrical condition, including fitting chafer strips over its beads, positioning the tyre or carcass within a rigid encircling member, pressing a roller against the inside of the bead so as to compress it against the wall of the member, and rolling the roller around the inside of the bead to consolidate the chafer strip thereto throughout its circumference.

The invention is illustrated by way of example by the accompanying drawings which show a machine incorporating the invention. In the drawings.

Figure 1:
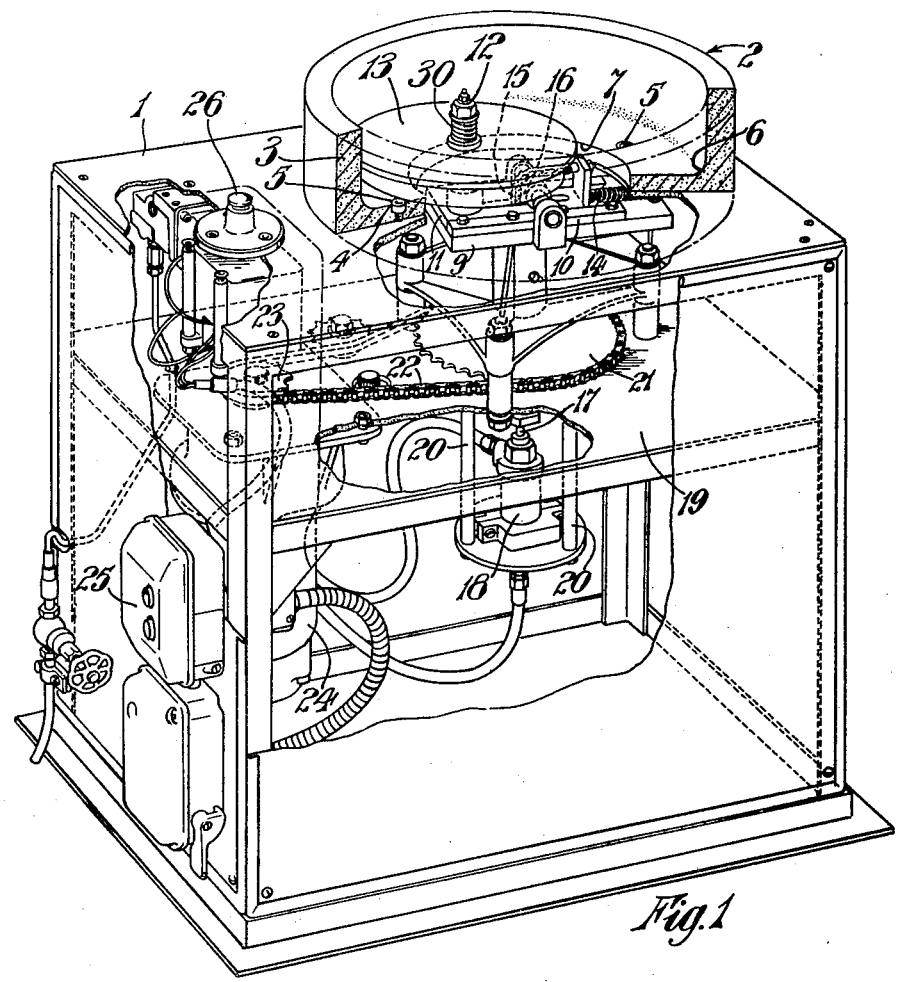
FIGURE 1 is a perspective view of the machine, parts of its structure being cut away to show constructional details.

Referring first to FIGURE 1 the machine comprises a table-like frame 1 on top of which is secured a bowl-like encircling member 2 having an upstanding cylindrical wall 3 and a base 4 which is secured to the frame 1 by bolts 5. The junction of the wall and the base is rounded internally as indicated at 6 by fitting snugly the bead of a raw tyre received in the bowl, as will be described.

At the centre of the base 4 is an aperture 7 towards which extends from within the frame an upstanding hollow rotatable shaft 8. On top of the shaft 8 is mounted a plate 9 parallel to and just below the base, having a pair of guide members 10 secured to its upper surface and defining between them a radial guide channel of dovetailed cross-section. Received in the guide channel is a slide 11 carrying an upstanding bearing pin 12 passing through the aperture 7 into the bowl 2. On the pin 12 is rotatably mounted close to the base a disc-like planet roller 13 of diameter somewhat over half the internal diameter of the bowl. The thickness of the planet roller is approximately equal to half the width of the chafer strip of an average tyre.

The slide 11 is connected to the plate 9 by a tension spring 14 which tends to draw the slide radially inwardly so as to hold the roller clear of the wall of the bowl. A chain 15 is connected to the slide and passes over a sprocket wheel 16 mounted on the plate and down the hollow shaft into the interior of the frame 1. Its end is connected to the piston rod 17 of a vertical pneumatic cylinder 18 suspended from a lower deck 19 of the frame by bolts 20. By pressurising the cylinder 18 the chain 15 can be drawn downwardly so as to move the slide radially outwardly against the action of the spring 14 and bring the roller 13 into contact with the wall 3 of the bowl, or with a tyre positioned therein.

The hollow shaft 8 carries at its lower end, just above the lower deck 19 of the frame a chain sprocket 21 around which passes a chain 22 engaging a second sprocket 23 driven by a motor 24 suspended from the lower deck 19. By operating the motor the shaft 8 can be rotated to revolve the roller 13 in planetary fashion around the axis of the bowl.

Press button controls 25 and 26 are provided respectively for controlling the motor 24 and the pneumatic cylinder 18, the control 26 including a timer for regulating automatically the duration of operation of the machine on a tyre.

In use of the machine the shaft 8 is preferably continuously rotated. The slide 11 is normally drawn inwardly by the spring so that the planet roller revolves about the axis of the shaft near the centre of the bowl. A raw tyre or tyre carcass, after building and before vulcanisation, in which state it is in a substantailly cylindrical form, is placed in the bowl with one of its beads, embraced by the chafer strip, resting upon the base 4 and with the planet roller within it, the wall 3 of the bowl encircling the tyre or carcass. It will be understood that the bowl must be larger than and the roller somewhat smaller than the diameter of the tyre or carcass to be treated. In practice the differences between the diameters of the bowl and the roller are such that a series of sizes of tyre can be treated, for example each of the normal sizes of car tyre.

With the tyre or carcass in position in the bowl the operator operates the control 26 which pressurises the pneumatic cylinder 18 causing it to draw the chain 15 downwardly over the sprocket 16 and thus move the slide 11 and roller 13 radially outwardly until the latter engages the inner surface of the chafer strip and carries the tyre with it until the adjacent portion of the bead is gripped against the wall 3 and received snugly in the curved junction 6 between the wall and the base. The roller, continuing its normal revolutions, then rides round the bead of the tyre, pressing it continuously against the wall 3 and so causing the tyre itself to roll around the wall in a gyratory manner. The whole of the bead is thus compressed between the roller and the wall, and the chafer strip is consolidated to the bead around its whole circumference. In practice it is found that two or three revolutions of the shaft after the roller is brought into contact with the tyre are sufficient for satisfactory consolidation. The timer associated with the control 26 is therefore set to release the pressure from the cylinder 18 after the lapse of sufficient time for this or some other desired number of revolutions to be completed. Thus the tyre is automatically released and can be removed by the operator and inverted and replaced in the bowl for operating on the other bead.

Figure 2:
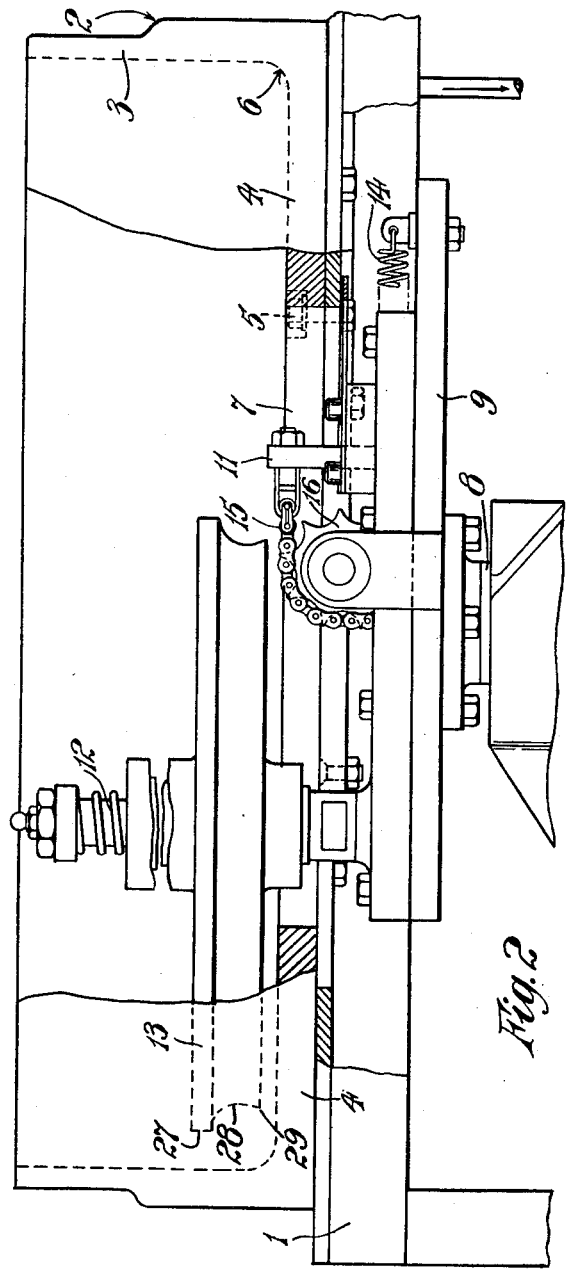
FIGURE 2 is a sectional elevation of a portion of the machine.
Figure 3:
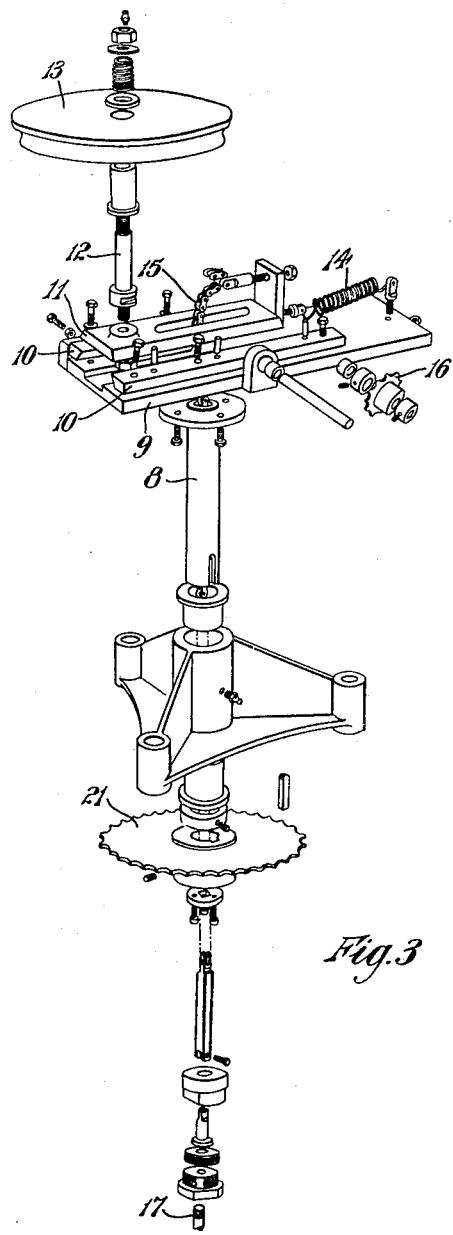
FIGURE 3 is an exploded perspective view of another portion of the machine.

Preferably the roller 13 is profiled to match the shape of the beads of tyres on which it is to operate. In the illustrated embodiment it will be seen in FIGURE 2 that the roller has a flange or portion 27 of enlarged diameter at its part remote from base 4 of the bowl and curves smoothly from this portion to its central region 28 which is of less diameter and flares slightly outwardly towards its lowermost portion 29. The bearing of the roller on the pin 12 permits a degree of linear movement as well as rotation and a spring 30 surrounds the pin above the roller so as to urge it towards the base. This arrangement enables the roller to lift automatically when operating on a tyre having a deep bead and to remain in its lower position when operating on smaller beads. Thus satisfactory consolidation can be obtained with beads of various sizes. The spring also produces a desirable downward pressure on the bead and facilitates consolidation.

Whilst in this embodiment the roller is revolved while the bowl is held stationary, it will be understood that the roller could be mounted on a fixed plate similar to the plate 9 whilst the bowl could be rotated. It is necessary only to produce relative rotation between the roller axis and the bowl, about the axis of the latter, so as to cause the roller to ride around the bead of a tyre and the tyre itself to roll around the bowl.

Again, in this embodiment, after operating on one bead of a tyre or carcass, the tyre is inverted in the bowl and the operation repeated on the other bead, both operations being initiated by pressing the button control 26 and terminated by release of pressure from the cylinder 18 by the automatic timer.

As mentioned previously, the bowl 2 and roller 13 are preferably dimensioned so that the machine can be used on tyres of various size, for example each of the common sizes of car tyre. It is necessary only that the bowl should be of internal diameter a few inches greater than the largest tyre to be operated upon, and the roller should be small enough to fit freely within the smallest tyre. The depth of the wall 3 of the bowl should be at least a quarter of the width of the largest tyre so as to be able to give adequate support to the tyre to keep it in shape during the operation.

Figure 4:
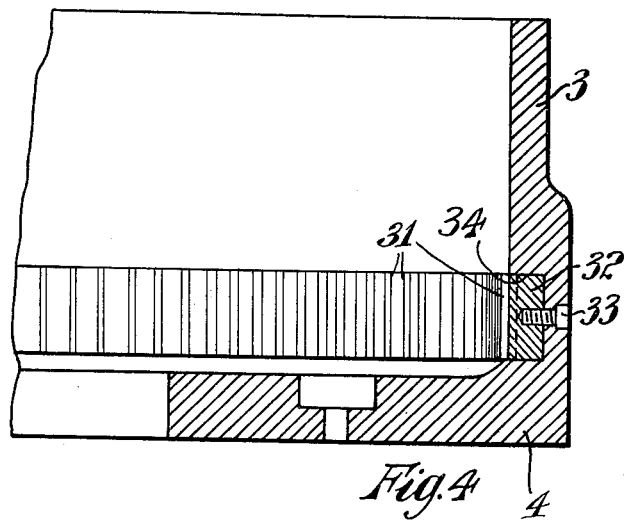
FIGURES 4 and 5 show a modification.
Figure 5:
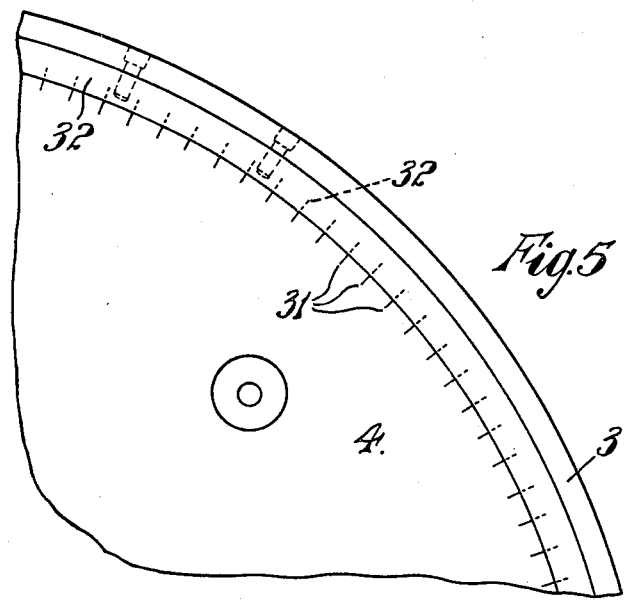

In a modification of the embodiment, as shown in FIGURES 4 and 5, a series of small knife blades 31 are mounted in a segmented ring insert 32 held by bolts 33 in a recess 34 around the wall of the bowl 2 adjacent its base 4. The blades 31 project radially inwardly so as to engage the tyre or carcass at the junction of the sidewall and bead, and cut a series of shallow slits in its surface. These slits allow trapped air to escape during the moulding of the tyre and so assist in preventing porosity or separation of the chafer strip from the bead.

Having now described our invention, what we claim is:

1. Apparatus for consolidating chafer strips in the manufacture of pneumatic tyres comprising a rigid member having a cylindrical portion for receiving a tyre carcass in the substantially cylindrical condition in which it is built and a bead support extending radially inwardly of and disposed immediately adjacent to the cylindrical portion, and a planet roller mounted within the cylindrical portion for radial movement with respect to the rigid member from a radially inward position to a position adjacent to the inner peripheral surface of the cylindrical portion, with the axis of the roller parallel to the axis of the rigid member, to engage a chafer strip of a bead of a tyre carcass received within the rigid member, and press the carcass against said cylindrical portion, the roller and the rigid member being mounted for relative rotation eccentrically one with respect to the other to progressively consolidate the chafer strip.

2. Apparatus for consolidating chafer strips in the manufacture of pneumatic tyres comprising a rigid member having a cylindrical portion for receiving a tyre carcass in the substantially cylindrical condition in which it is built and a bead support extending radially inwardly of, and disposed immediately adjacent to the cylindrical portion, a rotatable shaft mounted coaxially with the rigid member, a plate slidably yet drivably mounted upon the shaft and located with the cylindrical portion of the rigid member, a planet roller rotatably mounted upon the plate with the axis of the roller parallel to the axis of the rigid member, said roller being movable together with the plate, from a radially inward position to a position adjacent the inner peripheral surface of the cylindrical portion to engage a chafer strip of a bead of a tyre carcass received within the rigid member and press the carcass against said cylindrical portion to progressively consolidate the chafer strip.

3. Apparatus according to claim 1 wherein the cylindrical member has means for locating the bead in alignment with the roller.

4. Apparatus according to claim 1 wherein the cylindrical member is of bowl-like shape, having an inward radial flange at one end forming the base of the bowl and the roller is mounted just above this base so that the base forms locating means for supporting the bead of a tyre or carcass in alignment with the roller.

5. Apparatus according to claim 4 wherein the roller has a degree of axial movement away from the base to provide for satisfactory operation on different sizes of bead and is spring-urged toward the base to provide downward pressure upon the bead.

6. Apparatus according to claim 2 comprising a spring biasing the roller radially inwardly and means for moving said roller radially outwardly against the action of the spring.

7. Apparatus according to claim 6 wherein the means for moving a roller is a fluid-pressure operated cylinder.

8. Apparatus according to claim 1 wherein the roller is continuously revolved relative to the encircling member when the apparatus is in use and wherein said apparatus comprises a single control for causing the roller to move radially outwardly when desired.

9. Apparatus according to claim 8 wherein the single control includes a timer to release the roller and permit it to move radially inwardly when it has completed a predetermined number of revolutions relative to the encircling member after the operation of the control.

10. Apparatus according to claim 1 wherein the cylindrical member has radially inwardly projecting knife edges for engaging the tyre or carcass at the junction of its sidewall and bead and cutting shallow slits therein to provide for escape of air from the mould during the moulding of the tyre.

11. A method of manufacture of a pneumatic tyre comprising building the tyre carcass in a substantially cylindrical condition, including fitting chafer strips over its beads, positioning the tyre carcass in its substantially cylindrical condition within a rigid encircling surface, pressing a roller surface against the inside of the bead so as to compress it and the chafer strip against the encircling surface, and rolling the roller surface around the inside of the bead to consolidate the chafer strip thereto throughout its circumference with the carcass remaining in its substantially cylindrical condition.

12. Apparatus for consolidating a chafer strip on a pneumatic tyre carcass which comprises a rigid carcass supporting member having a cylindrical surface on which a raw cylindrical tyre carcass is receivable with its axis parallel with the axis of said cylindrical surface; a member to consolidate a chafer strip on a carcass on the cylindrical surface of said carcass supporting member and comprising a planet roller rotatable on its axis and means to support said planet roller to move toward said cylindrical surface of said carcass supporting member with its axis parallel to the axis of said cylindrical surface; and means to rotate one of said members relatively to the other about the axis of said cylindrical surface to rotate said roller about the surface of a carcass and chafer strip on said cylindrical surface.

13. Apparatus for consolidating a chafer strip on a pneumatic tyre carcass which comprises a rigid hollow carcass supporting member having a cylindrical inner surface within which a raw cylindrical tyre carcass is receivable with its axis parallel with the axis of said cylindrical surface; a member to consolidate a chafer strip on the inner surface of a carcass in said hollow carcass supporting member and comprising a planet roller within said cylindrical surface of said hollow carcass supporting member rotatable on its axis and means to support said planet roller to move toward said cylindrical surface of said carcass supporting member parallel with the axis of said cylindrical surface; and means to rotate one of said members relatively to the other about the axis of said cylindrical surface to rotate said roller about the inner surface of a carcass and chafer strip on said cylindrical surface.

References Cited in the file of this patent

UNITED STATES PATENTS

| | | |
|---|---|---|
| 1,433,971 | Roberts | Oct. 31, 1922 |
| 2,561,012 | Clark | July 17, 1951 |
| 2,690,207 | Godfrey | Sept. 28, 1954 |
| 2,703,131 | Robbins et al. | Mar. 1, 1955 |
| 2,717,022 | Duerksen | Sept. 6, 1955 |
| 2,734,553 | Rawls | Feb. 14, 1956 |
| 2,760,550 | Kimes | Aug. 28, 1956 |
| 2,812,546 | Soderquist | Nov. 12, 1957 |